March 31, 1970 K. FISCHER ET AL 3,504,123

TIME MULTIPLEX EXCHANGE SYSTEM TO PERMIT STATIONS PARTICIPATING IN EXISTING CONNECTIONS TO ESTABLISH A FURTHER CONNECTION

Filed Jan. 27, 1965 5 Sheets-Sheet 1

March 31, 1970 K. FISCHER ET AL 3,504,123
TIME MULTIPLEX EXCHANGE SYSTEM TO PERMIT STATIONS PARTICIPATING IN EXISTING CONNECTIONS TO ESTABLISH A FURTHER CONNECTION
Filed Jan. 27, 1965 5 Sheets-Sheet 2

TIME MULTIPLEX EXCHANGE SYSTEM TO PERMIT STATIONS PARTICIPATING IN EXISTING CONNECTIONS TO ESTABLISH A FURTHER CONNECTION

Filed Jan. 27, 1965 5 Sheets-Sheet 3

March 31, 1970 K. FISCHER ET AL 3,504,123

TIME MULTIPLEX EXCHANGE SYSTEM TO PERMIT STATIONS PARTICIPATING IN EXISTING CONNECTIONS TO ESTABLISH A FURTHER CONNECTION

Filed Jan. 27, 1965 5 Sheets-Sheet 4

3,504,123
Patented Mar. 31, 1970

3,504,123

TIME MULTIPLEX EXCHANGE SYSTEM TO PERMIT STATIONS PARTICIPATING IN EXISTING CONNECTIONS TO ESTABLISH A FURTHER CONNECTION

Kurt Fischer, Albert Fisch, and Horst Honold, Munich, Germany, assignors to Siemens Aktiengesellschaft, Munich, Germany Filed Jan. 27, 1965, Ser. No. 428,361
Claims priority, application Germany, Jan. 28, 1964, S 89,253
Int. Cl. H04j 3/02
U.S. Cl. 179—15 12 Claims

ABSTRACT OF THE DISCLOSURE

Time multiplex PABX which overcomes blocking problem in call transfer caused by requirement that transferee share common time slot with original parties. Problem is overcome by allowing remaining party of original parties to retain original time slot, assigning new party some random time slot, and storing energy in energy storage device during time interval between conversing time slots.

Figure 1A:
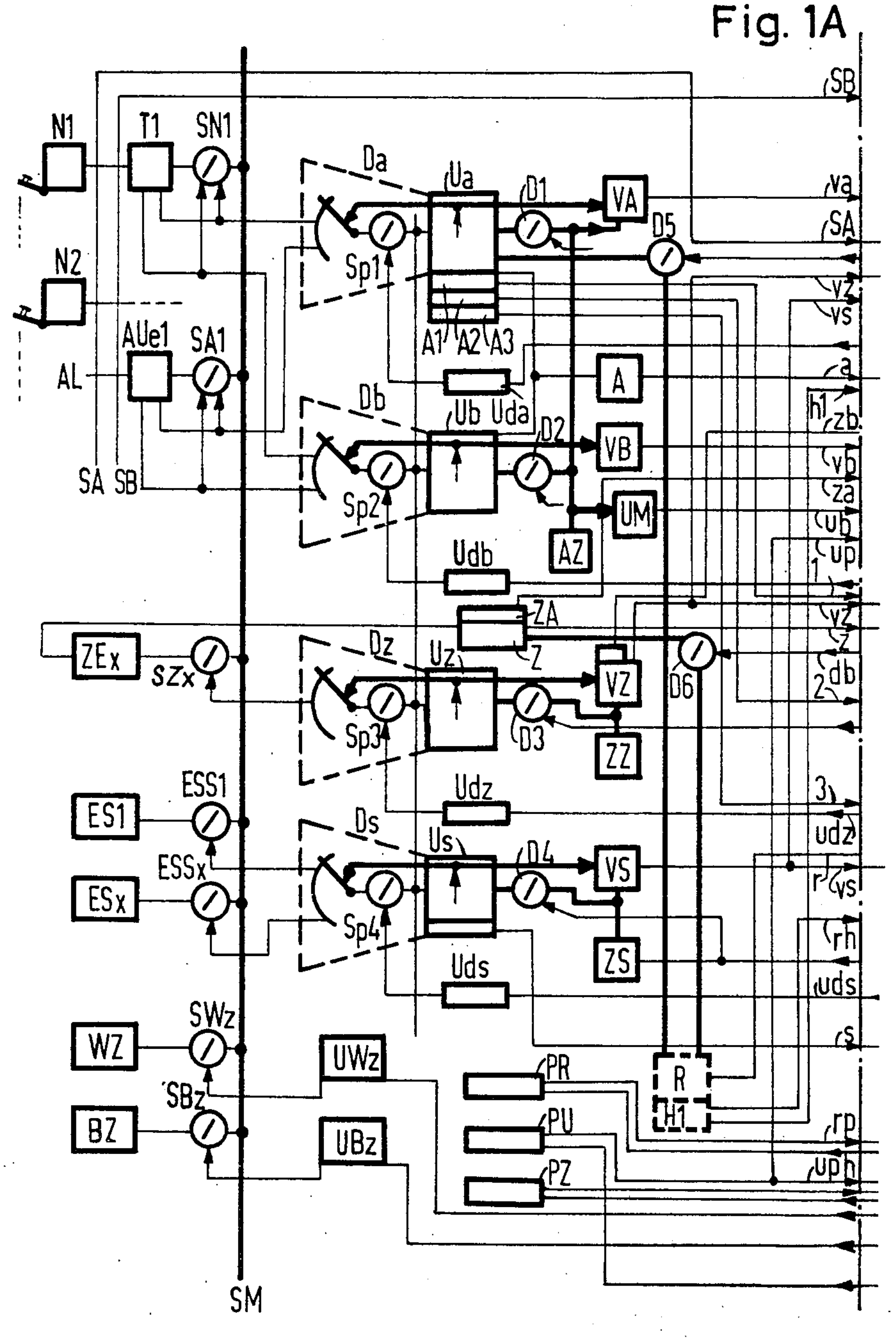

This invention concerns a circuit arrangement for an exchange system which operates in accordance with the time multiplex principle. More particularly, the invention concerns a PABX by which a station participating in an existing connection may establish a new connection to a station not participating in the existing connection.

In the known exchange systems operating in accordance with the time multiplex principle, the time slots are either assigned individually to the connection stations, or are assigned to the connections established. In the latter arrangement, connections between calling and called stations are established over speaking multiplex lines by means of time slots assigned to the connections. The function of the multiplex system is accomplished by operation of switches in a time slot assigned to the connection established, such switch operations being accomplished by means of a circulation storage device for either calling or called stations, with the cooperation of an appropriate decoder. For example, a pulse may be supplied from the circulation storage device for a calling connection station, to a corresponding switch, by way of a decoder, such pulse being in the time slot assigned to the connection path.

It is also known that circuit arrangements can be provided to operate in such manner that the speaking stations from different speaking station groups can be connected with each other over individual multiplex lines and individual connection time slots, by means of storage devices for speaking energy. In such systems, the speaking energy storage devices operate to store the energy which is to be exchanged between stations participating in a connection. If the stations participating in a connection are switched onto the multiplex lines of their groups at different times, the energy storage devices can bridge over the time interval between the operations of the speaking switches of the different stations to be connected together. Such a system is disclosed in Patent No. 3,251,943.

The purpose of the present invention is to provide for the establishment of a new connection between a station participating in an existing connection with an exchange office line, and another station, until that moment not in the connection with the first station, both stations being connected in an exchange system operating in accordance with the time multiplex principle, with time slots assigned to the stations and therefore to the established connections, and with provision for speaking energy storage devices, as indicated. Such new connections may be accomplished by special signals emitted by the station participating in the existing connection, as for example for the purpose of consultation for shifting of connections.

This purpose of the invention is accomplished through the use of different storage devices, including one special storage (PU) in which a pulse is stored in the time slot of the existing connection, after emission of a special signal given by a connection station participating in an existing connection. The special signal may be a special frequency combination. A second circulating storage device (U*s*) is provided to identify, upon request by the special signal, a second time slot which is not then in use for a connection. Both storage devices are connected with a central control apparatus which connects together the special signal and the new or free time slot into a combination signal, and wherein a further circulating storage device (U*a*) is connected in the second phase to receive the address of the station which is to be called in such as the consultation call. Finally a fourth speaking energy storage device (ES1) couples the first time slot to the second time slot.

In this arrangement in accordance with the invention, the third station not participating in the existing connection may be connected together with the station participating in the existing connection and desiring connection to the third station, by the use of a special time slot in which the identification of the third station is picked up. Then, the two stations may be connected together, even though identified in different time slots, though the use of speaking energy storage devices, and the central storage devices provided for the build up of connections may be employed for this purpose.

The drawings now to be described show operative embodiments of the invention in sufficient detail to provide for an understanding thereof. These operative embodiments are of systems in which the control, as well as the coupling together of the speaking paths, is accomplished by means of multiplex lines and in accordance with the time multiplex principle. However, it should be understood that the coupling together of the speaking paths, as well as the control of the establishment of connections, can also be accomplished through the use of spatial contact multiples. That is, time multiplexing is not essential but may be substituted for by space multiplexing. It should further be apparent that the actual construction of the central control apparatus can differ considerably, within the scope of the invention. In the operative embodiments disclosed in the drawings, the mode of operation of the control apparatus is described only insofar as absolutely necessary to explain the objects of the invention.

DETAILED DESCRIPTION

Figure 1B:
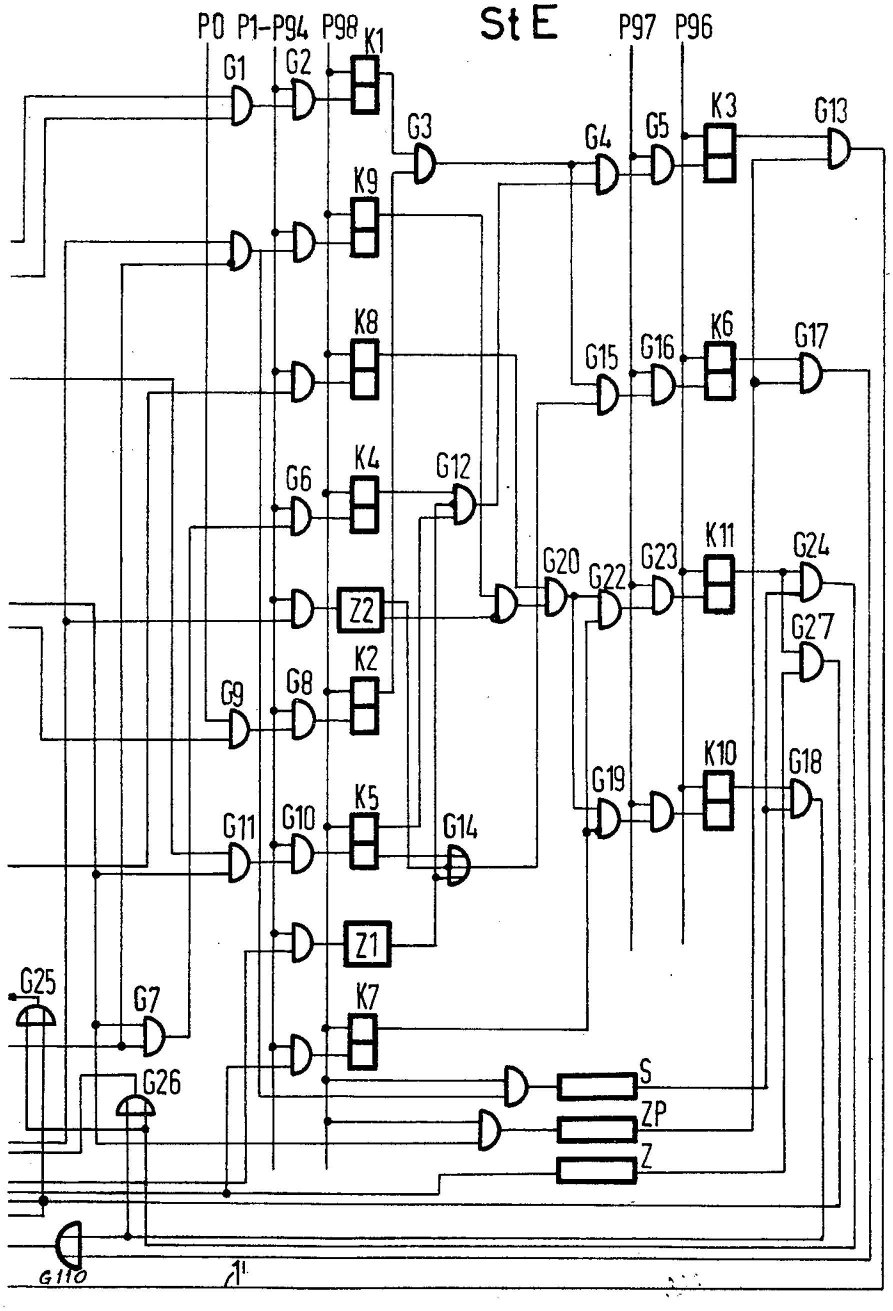
Figure 2:
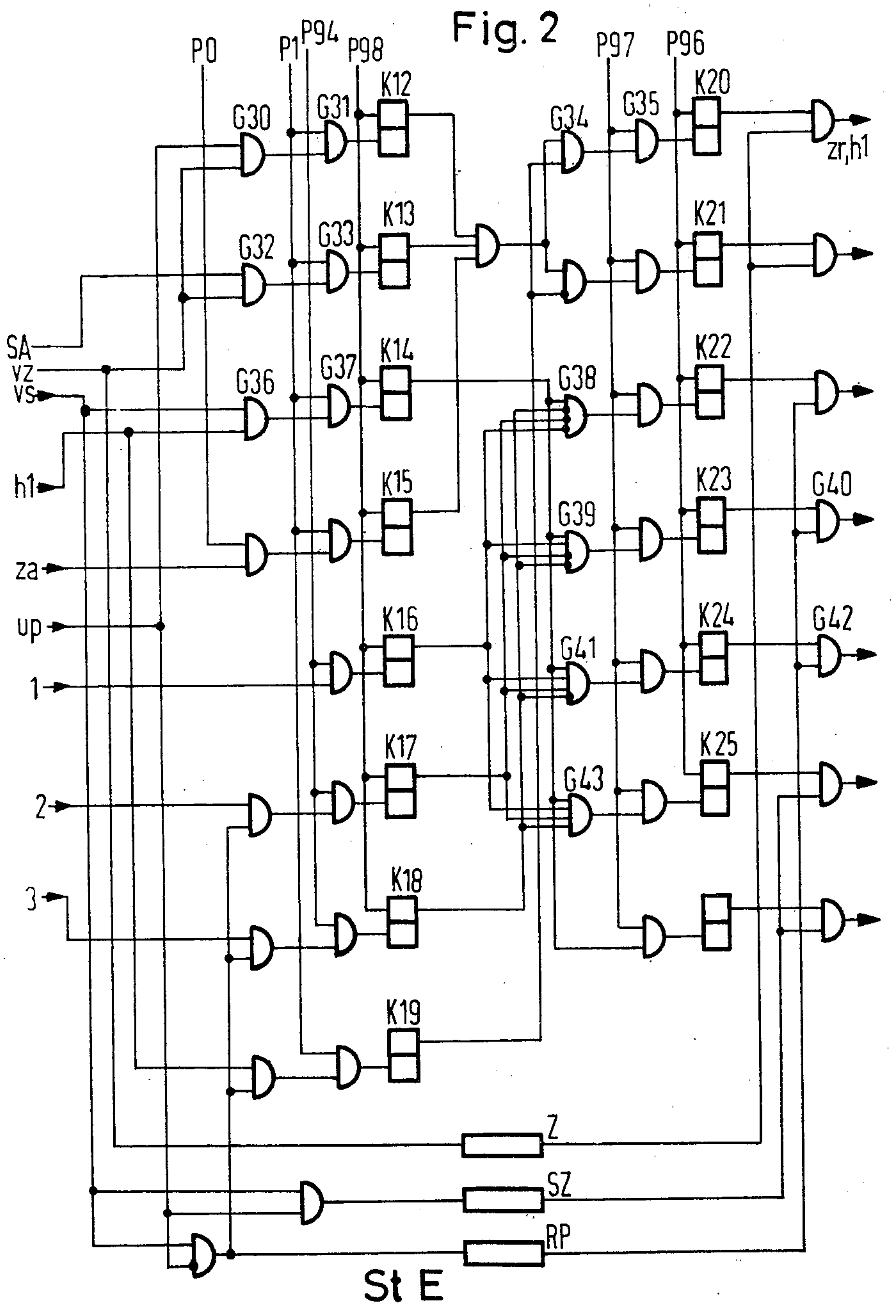
Figure 3:
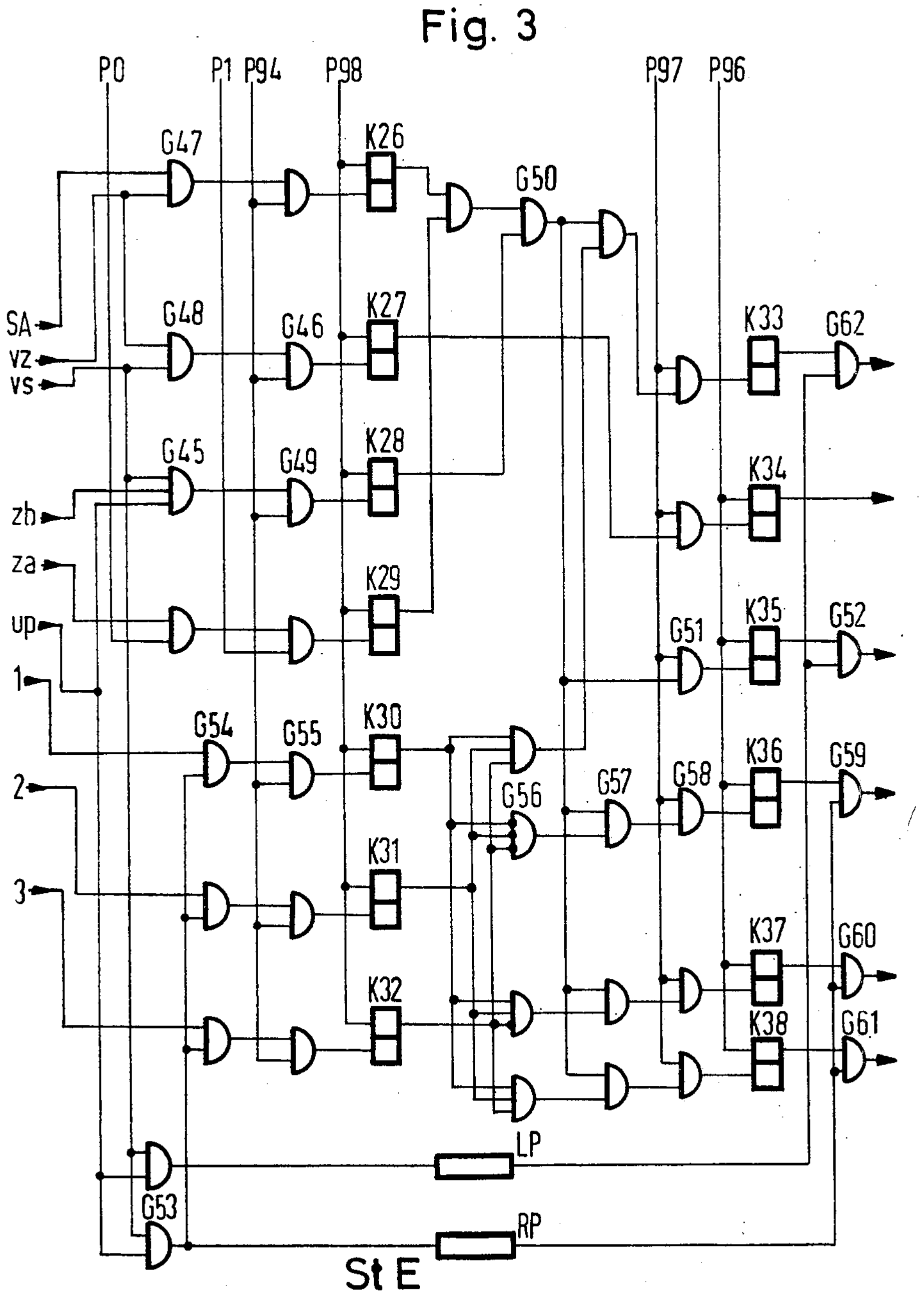
Figure 4:
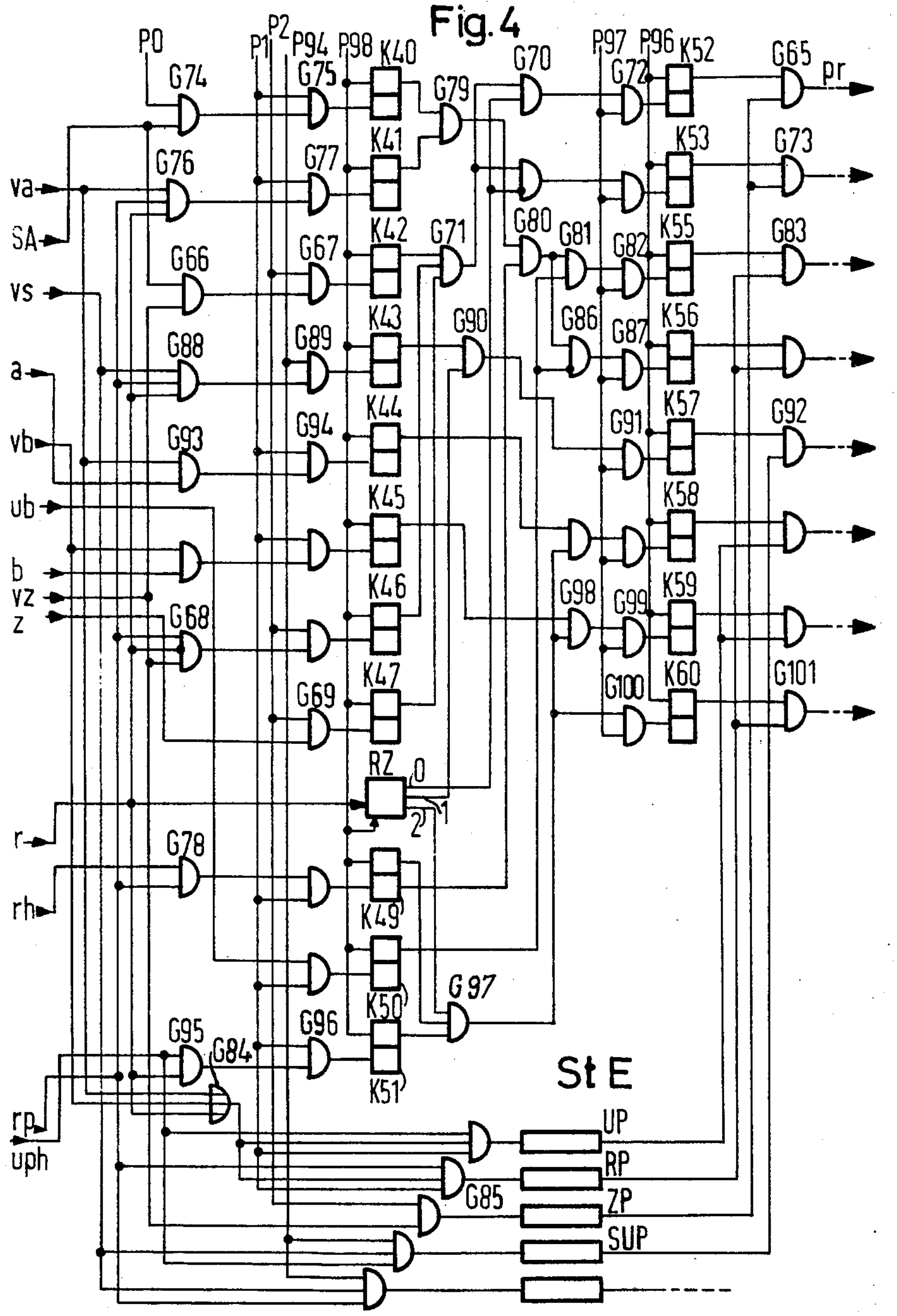

In the drawings:

FIGS. 1A and 1B (composed of a combination of the first two sheets of drawing) represents a diagrammatic showing of the entire operative embodiment of the invention, with the apparatus shown on the second sheet forming part of the central control apparatus and, FIGS. 2 through 4 are block diagram showings of various connections of the central control apparatus to accomplish different functions of the system.

As will be apparent after a discussion of the details of the apparatus of the figures, the control processes may either occur in a separate operation cycle, following an information cycle, or there may be no separate information and operation cycles. If no separate control and information cycles are provided, the switching processes may occur independently of control by the signal generators which cyclically provide the identifications of the stations, and may be dependent only upon the time slot cycle. In such case a more rapid execution of the switching processes is possible.

The left half of FIG. 1 (the first sheet of drawing) shows the system parts which provide for the build-up and the duration of a connection. The central control apparatus StE shown in the right half of FIG. 1 provides for evaluation of signals given by the apparatus in the left half and for the emission of commands based on such evaluation. In the left half of FIG. 1 the circulation storage devices for the addresses of calling and called speaking stations are respectively identified at *Ua* and *Ub*. Moreover, the circulation storage device for the digit receiver addresses is identified at Uz, while the circulation storage device for the speaking energy storage means is shown at *Us*. Each of these circulation storage devices may be of the type shown in Kneisel and Honold application Ser. No. 390,026, filed Aug. 17, 1964, now Patent 3,366,741. That patent is assigned to the same assignee as the present application.

The addresses presented by the corresponding address generators for these various circulation storage devices are stored in the storage devices in time slots assigned to a connection. As explained in the said Patent No. 3,366,-741, these circulation storage devices provide such addresses at the outputs thereof, at the specified time slots. The storage devices *Ua* and *Ub* for calling and called stations cooperate with the address generator AZ which cyclically provides identifications of the various stations of the PABX. In similar fashion, the circulation storage device Uz cooperates with the address generator ZZ for digit receivers, while the storage device *Us* cooperates with the address generator ZS for speaking energy storage devices. As explained in the above-mentioned application, the switches D1, D2, D3, and D4 can be operated in such fashion as to transmit the addresses present at the outputs of the corresponding address generators AZ, AZ, ZZ and ZS, respectively to the associated circulation storage devices, at the times of operation of the switches. The transmission of such addresses to the circulation storage devices is dependent upon control of the switches by the central storage apparatus, this being done in the time slots intended for the connection in question.

The apparatus of the invention is also provided with various comparator devices such as shown as VA, VB, VZ and VS. These devices are capable of comparing the outputs of the respective address generators with the outputs of the associated circulation storage devices, and providing signals to the central control apparatus upon coincidence between the respective two outputs. If such a coincidence occurs, it occurs in the connection time slot with which the address is stored in the corresponding circulation storage device.

As explained more fully in the above-identified prior application, decoders D*a*, D*b*, D*z* and D*s* are associated with the circulation storage devices and are operative to actuate speaking switches corresponding to the addresses of speaking stations stored in the circulation storage devices, so as to connect these speaking stations to the multiplex line. The operation of the decoders to perform this switching operation is dependent upon the actuation of blocking switches S*p*1, S*p*2, S*p*3, and S*p*4 associated with the respective decoders. These blocking switches are themselves controlled by auxiliary circulation storage devices shown at *Uda, Udb, Udz* and *Uds*, respectively. The switching through the speaking switches is then accomplished in the time slot in which a pulse from the auxiliary storage device is directed to the blocking switch. As an illustration, even though the speaking switch SN1 is identified by decoder D*a*, it cannot be operated in such fashion as to connect station N1 to the multiplex line SM, unless the blocking switch S*p*1 is operated.

The address generator AZ for speaking stations is also connected to a storage device UM which may store special further identifications assigned to specific addresses for speaking stations. For instance, "continuation" switching addresses, for speaking stations which are to be called when there is no answer at a certain station, or upon absence of the subscriber from a station, may be identified in the storage device UM and may cause an appropriate signal to be supplied at the output of that storage device when its input receives an identification from the address generator AZ of a station for which a special authorization is stored.

It will be understood that the address generator AZ will store and cyclically furnish the addresses of all speaking stations, as well as of exchange office repeaters, so that all possible connection points are cyclically identified at the output of the address generator.

The apparatus of FIG. 1 further employs two separate signal multiplex lines for calling and called speaking stations in existing connections, these being identified at SA for calling stations, and SB for called stations.

The switching to the multiplex lines of dial signals, free (or available) signals (ringback), busy signals, etc. takes place through the operation of auxiliary storage devices for such signals. These devices store the signals in the time slot in which the corresponding signals are to be switched to the multiplex line by way of associated switches.

For the purpose of implementing consultation and shifting of connections, there are provided auxiliary storage devices in which the signals necessary for the establishment of such connections are temporarily stored, so that the consultation and shifting operations may be carried out with the aid of the speaking energy storage devices. Such auxiliary storage devices include the device PR in which the consultation phase is identified, and storage device PU in which the phase of the original connection is identified. There may also be provided a further auxiliary register R in which the address of the speaking station which is to be consulted, can be temporarily stored. Further, an auxiliary storage device PZ may be provided in which the free or available time slots are identified.

The control apparatus StE mainly consists of logic and flip-flop circuits which operate upon certain input signals and provide certain command signals which may lead, for example, to the establishment of a consultation connection, or to the shifting of a call. The drawings, FIGS. 2, 3, and 4 show circuit details of the control apparatus which are required, respectively, for dialing in the case of consultation with the aid of an auxiliary register, or for dialing in the case of consultation during which the address generator for the speaking energy storage device is stopped, or for the shift of exchange office calls.

With the apparatus of FIGS. 1 through 4, it is possible by means of the central control apparatus not only to consult and to shift calls, but also to provide for operator-controlled exchange of calls between the various time slots. Moreover, such operators can switch themselves in and connect the stations to be exchanged. The switching processes to be followed in such cases approximate the processes required for consultation and call shifting. The only difference is that, by reason of the operation of the exchange by the operator, correspondingly different commands are provided by the central control apparatus. The switching together of the connections, or the registration of addresses of stations to be connected in the first or the second time slot, and the coupling together of the two time slots by means of speaking energy storage devices occurs in similar manner, as will be described later.

For the purpose of illustration of the operation of an apparatus of the kind shown in the drawings, it will be assumed that a time multiplex system of the type disclosed in the aforementioned patent application is employed. That is, it will be assumed that there are 1,000 stations per group and a scanning time of 100 microseconds per speaking station, so that at least 100 milliseconds per inquiry cycle are required, if only information cycles are to be employed. During the 100 milliseconds, each of the 1,000 station addresses is provided at the output of the address generator for separate 100 microsecond periods. During this time period of 100 microseconds, or information cycle, a checking operation is performed to determine whether in any one of the time slots there has been a change, in comparison with the previous inquiry cycle. These time slots are, of course, 100 in number during the duration of the presentation of each address at the output of the address generator. Commands from the central control apparatus are provided only in the case of indication of a change from the previous inquiry cycle. The 100 time slots serve in part for assignments to connections, for example, time slots numbers 1 to 94 may be used for this purpose. The remaining time slots may be used for controlling purposes, that is, time slots P95 to P0 may be used for this purpose. The pulse phase or time slot sequence is illustrated, for instance, in Darre et al. application Ser. No. 390,143, filed Aug. 17, 1964, now Patent No. 3,366,743.

If an operation cycle is to follow each information cycle, with commands for changes occurring only during the operation cycle and comparison occurring in the information cycle, the 100 milliseconds scanning operation is prolonged an additional 100 microseconds.

(A) Initiation of a consultation connection by emission of a special signal by a station participating in an existing connection It will be assumed initially that a speaking station N1 has established a connection with an exchange office line AL, in the time slot P1. In such case, the address of the speaking station N1 will be stored in the time slot P1 in circulation storage device U*a*. The address of the exchange office repeater A–U*e*1 connected to line AL will then be stored in the circulation storage device U*b* for called connections stations, also in the same slot P1. The speaking switches SN1 and SA1 are then operated, through the decoders D*a* and D*b* by operation of the blocking switches S*p*1 and S*p*2, provided that pulses circulate in the auxiliary circulation storage devices U*da* and U*db* in the slot P1. (The storage of these pulses and addresses is accomplished in known manner not significant here.) In such fashion the speaking station N1 and the exchange office line AL are connected to the speaking multiplex line SM in time slot P1 cyclically through operation of the switches SN1 and SA1.

If, during the existence of the connection in time slot P1, the subscriber at station N1 operates a signal key for the emission of a signal, such as for initiation of consultation, then a free digit receiver will be requested in the time slot P0, just as in the case of normal digit dialing. The address of this digit generator will be registered in the circulation storage device U*z* when the address of this digit receiver is provided at the output of the address generator ZZ provided for digit receivers. In such case, a pulse will be picked up in the auxiliary circulation storage device U*dz* in the slot P1, so that the blocking switch S*p*3 will be operated in time slot P1. As a result, through switch SZ*x*, the digit receiver ZE*x* will be connected to the speaking multiplex line in the time slot P1.

As a result of the connections so established, the signal emitted (such as a special frequency combination) will be picked up in the evaluation apparatus Z, in the time slot P1. During the time this special signal is connected to the speaking multiplex line, there is also a loop interruption in the subscriber circuit T1 because of the operation of the digit key, so that a signal is given by way of the signal multiplex line SA provided for calling connection stations. With the evaluation apparatus VZ indicating a coincidence between the output of the digit receiver address generator ZZ and the output of the circulation storage device U*z*, a signal in time slot P1 will be provided along conductor *vz* to one input of the logical AND gate G1 (sheet 2) in the control apparatus S*t*E. A signal will also be provided over the signal multiplex line SA to the other input of this AND G1.

The output of the AND G1 is supplied as one input to the AND gate G2, provided at its other input with pulses in time slots P1 through P94, from an appropriate clock generator (not shown). Consequently, the gate G2 provides an input to the flip-flop K1 which thereupon provides an input to the AND gate G3.

The other input of the AND G3 is provided by flip-flop K2 which is operated upon the indication of a coincidence from logical AND gate G8. One input of the gate G8 consists of pulses in all of time slots P1 through P94, while the other input is from the logical AND gate G9. The gate G9 is operated by the coincidence between the output along conductor *z* of the evaluation apparatus Z, indicating that an identification digit, such as the present consultation signal, has been emitted by the speaking station N1, and the output along conductor *vz* from comparator VZ.

The output of gate G3 is supplied to one input of AND gate G4. The other input to gate G4 is supplied from the output of AND gate G12. One input to the gate G12 is supplied by flip-flop K4, while the second input is supplied by the absence of an output from the counter Z1, and the third input is supplied from the flip-flop K5.

The flip-flop K4 supplies an input to the AND gate G12 when a free energy storage device is available during the information cycle, and the address at the output of the circulation storage device for digit receivers is in correspondence with the output of the address generator ZZ for digit receivers. In such case, an input is supplied to AND gate G7 over conductor *s*, and a second input is supplied to the same gate over conductor *vz*. The AND gate G7 then furnishes an output to the AND gate G6, whose other input is supplied by the clock generator and consists of pulses in time slots P1 through P94. Consequently, the output of the flip-flop K4 is operative to supply a signal to the gate G12 at this time.

The flip-flop circuit K5 supplies an output at this time, when it is identified that a signal is present on conductor *vz*, as well as a signal being present on conductor *a*. The latter indicates that the instant call is an exchange office call and such identification is necessary only when no more than one consultation is provided for in exchange office calls and consultation is to be avoided in internal group connections. The identification in the auxiliary storage device A may be supplied from the circulation storage device U*a* or the circulation storage device U*b*, when the address of the exchange office transmission is stored in such storage device. In other words, the auxiliary storage device A is provided with an indication when either one of the calling and called stations is an exchange office repeater, and over conductor *a* a signal is thereupon supplied to the AND gate G11. With the logical AND G11 furnishing an output, the AND gate G10 is also operated, since its other input consists of pulses in time slots P1 through P94. Consequently, the flip-flop K5 is operated and supplies a second input to the AND gate G12.

As shown schematically in FIG. 1, the output of the counter device Z1 is inverted at the input of the AND gate G12. Thus, a third signal is present at the input of AND gate G12 except when the output of the counter is on. The output of this counter is provided only when five or fewer time slots are taken up by a corresponding five or fewer free exchange office repeaters.

As previously indicated, with the AND gate G12 on, the AND gate G4 provides an indication of coincidence and supplies its output to the gate G5. Then, at pulse time slot P97, the flip-flop K3 is turned on.

Recapitulating, the flip-flop K3 is turned on when, during the information cycle, (a) a signal is present on the signal multiplex line SA; (b) the conductor *vz* carries a signal indicating a coincidence between the current output of the address generator ZZ and the address of the digit receiver then supplied at the output of the circulation storage device U*z*; (c) the fact that the present connection includes an exchange office repeater is identified by a voltage on conductor *a*; (d) the fact that a consultation signal has been provided is identified by a voltage on conductor *z* (which of course, receives such identification from a device Z responsive to the free digit receiver ZE*x*); and, (e) the conductor *s* indicates the availability of a speaking energy storage device, by supply of an appropriate voltage.

In other words, the turn on of the flip-flop K3 identifies the fact that there is a desire for consultation and that such reconfirmation desire can be stored. This storage of the consultation desire takes place in the operation cycle and is performed with time slot P1 of the originally existing connection, which of course included the connection station which emitted the signal requesting consultation.

A travel time link ZP is provided to furnish a second input to the AND gate G13, the first input being supplied by the flip-flop K3. A voltage is available at the output of storage device ZP at time P98, but during the operation cycle, rather than the information cycle. This pulse is then provided over the conductor 1′ to an auxiliary storage device PU which stores the time slot of origin, that is, the original time slot of the existing connection. In fashion not shown, it can also be provided that a command be given to cancel the address of the previously seized digit receiver in the circulation storage device U*z*. The address generator for digit receivers may then be stopped for evaluation of the transmitted signal and can thereupon be switched forward again. The emission of the resulting command takes place from the central control apparatus, also through operation of logical AND G13, but is not shown.

At this time, there are different possibilities in the further control of initiation of consultation. For example, consultation may not be possible since the auxiliary storage device PU for the storage of the consultation pulse may be full, or it may not be possible since there is not available any time slot for establishment of the consultation connection, or for the reason that an exchange office call is not taking place, or for the reason that no second speaking energy storage device is free (that is, available). In each of these cases, a busy signal is to be transmitted to the station emitting the consultation signal.

A special counter Z1 is provided for the identification of the seized or busy nature of the auxiliary storage device PU by the consultation pulse. The special counter Z1 is so constructed and connected that it does not furnish an output voltage to the OR gate G14 if the auxiliary storage device PU is engaged. In such case, through inversion of this input an output is supplied by that gate to the AND gate G15. The other input to AND gate G15, of course, is up at this time, as indicated above, so that the AND gate G16 is thereby turned on at time slot P97. Consequently, the flip-flop K6 is operated to furnish a second input to the AND gate G17. The first input of this AND gate is supplied with the output of a travel time link ZP, so that the output of the AND gate G17 indicates a coincidence at time slot P1, during the operation cycle. The output of gate G17 is directed through gate G110 to a circulation storage device UB*z* which thereby turns on the station switch SB*z* at time slot P1 to connect the busy generator BZ to the speaking multiplex line SM.

In such case, the address of the seized digit receiver is also canceled and the address generator for digit receiver addresses is switched forward, in a manner not shown.

It will be noted that the special counter Z1 is also connected to the input of the OR gate G14. Consequently, when a pulse is present at the output of the counter Z1 indicating the non-availability of a time slot for the establishment of internal connections, the OR gate G14 furnishes a pulse to the AND gate G15, similarly as when the counter Z2 does not furnish an output. Consequently, a busy signal is switched onto the speaking multiplex line in the same manner as previously indicated. Moreover, if no exchange office call is in existence, no signal is provided over the *a* conductor, so that the flip-flop K5 is not operated in the manner previous described above when it was assumed that an exchange office call was in existence. Accordingly, since the third input of the OR gate G14 is connected to the other output of the flip-flop K5, the AND gate G15 is again operated, so that a busy signal is provided.

Control of the circulation storage device UB*z* for switching a busy signal on to the speaking multiplex line SM is also affected by operation of the AND gate G18. That gate is operated when no time slots are available, and is also operated when no speaking energy storage devices are available. Moreover, in such case, the address generator ZS for speaking energy storage devices is switched forward, and the pulse in auxiliary storage device PR, identifying the initiation of consultation, is canceled.

As indicated in FIG. 1, control of AND gate G18 is dependent upon operation of the flip-flop circuit K7, counter Z2, and flip-flop circuit K8. The flip-flop circuit K7 is operated when the circulating storage device PZ indicates the availability of a time slot. Only in such case is the AND gate G19 operated. That is, AND gate G19 operates if corresponding signals are provided from AND gates G20 and G21. The operation of AND gate G20 to furnish such a signal depends upon whether the counter Z2 provides indication that the auxiliary storage device PR is available, and also depending upon whether the flip-flop circuit K8 is operated. The operation of the flip-flop circuit K8 depends upon whether the identity-indicating device VS responds to a coincidence of the address of the speaking energy storage device address generator ZS and the output of the corresponding circulation energy storage device U*s*. In addition, the flip-flop circuit K9 is operated upon indication of the presence of a consultation pulse in the storage device PR, but only if at the same time no speaking energy storage device is then available, this being indicated by the lack of the availability of a pulse on conductor *s*.

In the fashion indicated, the flip-flop circuit K10 and the AND gate G18 are operated only if no speaking energy storage device is free, that is, if no time slot is available. In such case, a busy signal is switched to the speaking multiplex line SM.

However, if consultation is possible, the flip-flop circuit K11 is operated when the flip-flop circuits K1 and K9 are in operation and the counter Z2 simultaneously indicates that the storage device PR is available. In such case, the flip-flop circuit K1 is operated, by reason of the presence of signals on the signal multiplex line SA and the conductor *vz*. Simultaneously, the flip-flop circuit K9 is operated when a signal is stored in the auxiliary storage device PR in the time slot P1, and when the availability of a speaking energy storage device is identified by the presence of a voltage on conductor *s*. Also, the flip-flop circuit K7 is operated when time slots are identified as available in the circulation storage device PZ.

When all of the above conditions are fulfilled, the AND gates G22 and G23 are operated, so that the flip-flop circuit K11 is operated in time slot P97. One input is therefore present at AND gate G24. A second input is available at time slot P1 during the operation cycle, by reason of supply from the travel time link storage device S. The AND gate G24 then supplies a pulse to the OR gate G25, which, in turn, supplies a voltage over the conductor *uds* to the auxiliary circulation storage device U*ds*. The circulating pulse of slot P1 in the device U*ds* then operates the blocking switch S*p*4 to permit the combination of the circulation storage device U*s* and the decoder D*s* to turn on the switch ESS1 in time slot P1, to connect the energy storage device ES1 to the signal multiplex line SM in time slot P1.

The AND gate G24 also supplies a voltage to the OR gate G26 which operates to cancel the consulation pulse circulating in slot P1 in the circulation storage device PR.

As shown in FIG. 1, there is another AND gate G27 which receives an input from the flip-flop K11 at the same time that the AND gate G24 receives such input. The second input to AND gate G27 is received from the travel time link Z. The input of this link is supplied with the first available or free time pulse from the device PZ, which for example, might be pulse P2. The link Z delays this pulse so that a pulse of the same slot is supplied to AND gate G27 in the operation cycle, rather than in the information cycle. When the AND gate G27 then supplies an output with time slot P2, that output is directed to the auxiliary storage device UWz. This device controls the switch SWz to switch a dial signal to the speaking multiplex line in the slot P2. The output of the AND gate G27 is also supplied through the logical OR G25 to the auxiliary circulation storage device Uds, so that the blocking switch Sp4 is operated at time slot P2. As a result, the speaking energy storage device ES which is then identified in the circulation storage device Us, is switched to the speaking multiplex line SM. The energy exchange between slots P1 and P2 can then take place by means of this energy storage device. In such fashion, the speaking station N1 also receives the dial signal in slot P1.

The output of the AND gate G27 is also connected to the circulation storage device PZ which contains the identifications of the free time slots. A purpose of this connection is to cancel the time slot P2 in the circulation storage device PZ, since this slot is no longer available.

In the fashion indicated, the initiation of consultation has led to the seizure of a free or unoccupied speaking energy storage device, to the storage in the circulation storage device Us of identification of this free storage device, and, through the connection of the seized storage device with slots P1 and P2 to the signal multiplex line SM, the exchange of energy between the station N1 and whatever is connected to line SM in pulse phase P2.

The apparatus of FIG. 1 provides for the beginning of the consultation connection. The elements of control apparatus StE shown in FIGS. 2 and 3 provide alternative approaches to completion of the connection.

(B) Consultation employing a register for temporary storage of one dial identification digit in each dialing operation FIG. 2 shows the elements of the control apparatus StE which are employed to provide for temporary registry of one dial identification digit during reception of the consultation dial signal. Referring to that figure, the flip-flop circuit K12 is operated through operation of AND gates G30 and G31. Gate G30 is connected to the output of storage device PU which indicates the slot of the original connection, that is, in this case, slot P1. The other input to AND gate G30 is taken from the output of the comparator device VZ, over conductor vz. An output is available on this conductor if the address of the digit receiver seized in slot P1 is present both at the output of the address generator Z and at the output of the circulation storage device Uz. With an output from AND gate G30, and pulse P1, the gate G31 is operated to operate the flip-flop K12.

Flip-flop K13 is similarly operated if AND gates G32 and G33 are both operated. One of the inputs to the gate G32 is furnished by a voltage present on conductor vz, which, as indicated above in conjunction with gate G30, is available at this time. The other input to gate G32 is from the signal multiplex line SA. This line furnishes a voltage at this point because of the interruption of the calling subscriber's loop caused by dialing of the consultation signal. The gate G33 receives both the output of gate G32 and time slot P1, so that it indicates a coincidence and therefore causes operation of flip-flop K13.

Finally, the flip-flop K15 is operated at this time, because conductor za is then furnished with a voltage from the digit receiving means Z, indicating that a digit is present in slot P0.

With flip-flops K12, K13, and K15 in operation, gate G34 is operated. Since the coincidence of operation of this gate with the pulse P97 furnished an output from the gate G35, the connected flip-flop K20 is then operated. This flip-flop identifies the fact that transmission of a digit to the register R is now possible.

If a pulse appears in slot P1 at the output of auxiliary storage device Z controlled by the circulation storage device for digit receivers, the following commands are given by the central control apparatus, during the operation part of the cycle:

(1) The switch D6 is turned on over wire db to connect the apparatus Z to the auxiliary register R to cause registration of the digit identification in the register;

(2) The auxiliary storage device H1 associated with the register R is provided with a pulse in slot P1 which is transmitted over conductor H1; and, (3) The address generator for digit receivers is switched forward in a manner not shown.

Since it is now identified in the auxiliary storage device H1 that a digit is stored in the register R, the transmission of this digit is controlled in the phase P2, that is, the consultation phase. The transmission is from the register R to one of the two circulation storage devices for called and calling speaking stations. The control takes place through operation of a flip-flop circuit K22 in accordance with the operations now to be described.

A flip-flop circuit K14 is now operated, since the associated AND gates G36 and G37 have been operated in time slot P1. One of the inputs to the AND gate G36 is obtained from conductor vs which provides a voltage when the address generator ZS for energy storage devices provides the address of such a device which is, at the same time, being provided at the output of circulation storage device Us, in time slot P2. The other input to the logical AND G36 is obtained from conductor h1, which has available a voltage at this time, as described above. The AND G36 furnishes one input to the AND gate G37, the other input being the pulse slot P1.

The flip-flop K14 is now operated and furnishes an operating voltage to the AND G38. The other inputs to this AND are inversions of the outputs of flip-flops K16, K17 and K18. These flip-flops are not on during the first digit, so that the AND G38 indicates a coincidence and causes operation of flip-flop K22 at time slot P97. As a result of operation of flip-flop K22, a command pulse is provided from the central control apparatus during the operation cycle, by reason of the delay furnished by the time link RP. This pulse controls the transmission of the first digit of the address of the speaking station to be consulted from the auxiliary register R to the appropriate circulation storage device, for example, the device Ua. This operation may, for instance, result in actuation of switch D5 to switch the identification of the digit into the input of the circulation storage device Ua, in phase P2.

When the second digit of identification of the station to be consulted is available in slot P1 in the digit receiver Z, the processes previously described for the transmission of a digit to the register R are repeated. After this second digit is stored in register R, the flip-flop circuit K16 is operated through the auxiliary storage device A1 and the flip-flop circuit K14 is also operated. The auxiliary storage device A1 furnishes a voltage over conductor 1 when the first digit has been received, so that the flip-flop K16 is turned on at time P94. The coincidence of the output from flip-flop K16 and the output from flip-flop 14 operates the logical AND G39, which simiularly receives outputs from the flip-flops K17 and K18, though these outputs are inverted at the input of the gate G39.

At time P96, the flip-flop K23 is therefore operated to cause operation of the AND gate G40 during the operation cycle, in time slot P2. The output of gate G40 furnishes a command pulse to cause transmission of the second digit from register R to the circulation storage device Ua by operation of switch D5.

The registration of a digit in the register R takes place only after the transmission of the previously registered digit to the circulation storage device, and such registration occurs in dependence upon the control pulse provided by the auxiliary storage device H1. Following the transmission of the second digit from the register R to the circulation storage device U*a*, the flip-flop circuits K16 and K17 are operated in slot P2 through indication by the auxiliary storage device A2 that the second digit has been received by the circulation storage device U*a*. If the third identification digit of the reconfirmed station is also provided and stored in register R, the flip-flop circuit K14 is also in operation. Consequently the logical AND G42, which is responsive to the inversion of the output of flip-flop K18, and the coincidence of the outputs of flip-flops K14, K16 and K17, supplies an output. The flip-flop K24 is therefore operated and causes operation of the AND G42 during the succeeding operation cycle, in time slot P2. The output of the AND G42 causes transmission of the third digit from the register R to the circulation storage device U*a*.

It is assumed, with the operative embodiments of the invention disclosed in this application, that three digits fully identify the reconfirmed station. In order to protect against the dialing of a fourth digit, the outputs of the flip-flop circuits K16, K17, and K18 are directed, with the output of flip-flop K14, to logical AND G43. Since the flip-flop K18 is operated by indication of reception of the third digit by the auxiliary storage device A3, the transmission of a fourth digit will cause operation of flip-flop K14 and result in a voltage being present at the output of the AND gate G43. The output of this gate operates the flip-flop K25, which can cause a suitable command pulse to occur in the next operating cycle, to do such things as switch a busy signal to the speaking multiplex line and to prevent switching of the consulted speaking station to the multiplex line in the slot P2.

If only the correct number of digits to identitfy the station to be consulted is transmitted, the address of that station is stored in the circulation storage U*a* in the time slot P2. If a corresponding time slot is stored in the auxiliary circulation storage device U*da*, the blocking switch S*p*1 will be operated at time slot P2, so that the station to be consulted, for example N2, can be connected to the speaking multiplex line in slot P2. If it is desirable that the exchange office party not participate in the consultation call, the pulse of slot P1 can be cancelled from the auxiliary circulation storage device U*db*, so that the blocking switch S*p*2 can no longer connect an exchange office repeater to the speaking multiplex line by way of the switch SA.

The station N1 is then connected in time slot P1 to the speaking multiplex line and the speaking energy storage device ES1 joins the pulse phases P1 and P2 through an energy exchange. In such fashion, there exists a consultation connection between the speaking station N1 and the speaking station N2, for example, in the slots P1 and P2.

The two slots P1 and P2 are, in effect, joined together by reason of the fact that capacitors are provided in the speaking energy storage devices which, with the aid of appropriate inductance coils, can cause a charge exchange, in a manner already known. That is, a charge may be exchanged between the capacitors or condensers switched to the speaking multiplex points at the same time. This exchange causes the connection between the speaking stations N1 and N2, which are connected to the speaking multiplex line SM, in the slots P1 and P2.

It, of course, can occur that the auxiliary register R for digit identifications of the station to be consulted, is busy. In this case, digit transmission is not possible. The assigned or seized nature of the register R is identified through operation of the flip-flop K19 which operates flip-flop K21. In such case, a busy signal can be switched to the signal multiplex line in the slot P1 during the operation cycle. For this purpose, an impulse is intended to be registered in time slot P1 in the auxiliary storage device UB*z*. The identification signals already stored, such as "digit ready to be picked up," and "digit receiver seized," are then canceled. Further, the address generator for digit receivers is switched forwardly.

(C) The dialing operation in consultation with the stoppage of the address generator for speaking energy storage devices This example differs from that described with reference to FIG. 2 in that no register for intermediate storage of digits is used.

The control commands emitted by the control system S*t*E as a result of the consultation initiation make it possible that the code numbers dialed by the consulting station, which are read with the time slot P1 by the digit receiver Z are registered with the seized consulting time slot, e.g., P2, in one of the two circulating stores for calling or called stations U*a* and U*b* as address of the station to be consulted. This is accomplished by holding of the address generator for speech energy stores ZS.

The flip-flop K27 is rendered operative when, through the gate G48, the gate G46 is rendered effective. This activating of the gate G48 is effective when a signal is switched to the wire *vs*, on presentation of an address of a free speech energy store at the output of the address generator ZS and at the output of the circulating store U*s*, in which the address of this speech energy store has been recorded in the time slot P1. In addition, it must be indicated at the input of the gate G48 via the wire *vz* that in the digit receiver Z a digit has been stored in the time slot P1.

By activating the flip-flop K27, the flip-flop K34 will be rendered operative in the time slot P97. This means that a digit has been registered in the digit receiver Z. The flip-flop K34 then issues a command signal to the address generator for speech energy stores ZS and thus this is switched forward one step and then held.

At the same time, the flip-flop circuits K26 and K28 are operated to cause cancellation of the address of the seized digit receiver to take place in the circulation storage device U*z* for digit receivers. The AND gate G47 causes operation of the flip-flop K26 when it receives over signal multiplex line SA the indication of interruption of the initial connection by the consultation digit signal, and when it receives over conductor *vz* an indication of the presence in the circulation storage device U*z* for digit receivers of the same address which is then presented at the output of the address generator ZZ for such receivers.

The flip-flop circuit K28 is controlled by the AND gates G45 and G49. The gate G45, like the gate G48, is connected to the conductor *vs* and similarly receives a voltage at this time. The AND gate G45 is also connected to conductor *zb*, and to the conductor *up*, both of which are supplied with voltages at this time for obvious reasons. The operation of both flip-flops K26 and K28 causes operation of the AND G50. The output of this gate is supplied to the gate G51 which responds to a pulse in the time slot P97 to cause operation of the flip-flop K35. Then, after a time delay caused by the travel time link LP the AND gate G52 is operated. The travel time link LP is responsive to the presence on conductor *up* of the pulse in the time slot of the original connection, namely P1, and furnishes a delay of, for instance, 100 microseconds, so that the command furnished by AND gate G52 will be delayed from the information cycle until the operation cycle. The command from the AND gate G52 is employed to cancel the seizure of the digit receiving apparatus Z and the signal "digit ready to be picked up." The address generator U*z* for the digit receivers and the address generator U*s* for speaking energy storage devices are simultaneously switched forward.

The stoppage of the address generator for speaking energy storage devices makes it possible to synchronize the cycles of the digit receivers and the speaking energy storage devices. In such fashion it becomes possible to pick up the dial signals received in slot P1 in the circulation storage device U*a* by means of the seized speaking energy storage device, though in another slot, such as P2. This picking up operation takes place successively in the case of dialing of such as a three digit identification number, such operation being accomplished through successive control of flip-flop circuits K30, K31, and K32.

The flip-flop circuit K30 is dependent upon operation of the AND gates G54 and G55. The gate G54 receives a voltage from the conductor 1 from the auxiliary circulation storage device A1 when the first digit of the identification of the station to the reconfirmed is stored in circulation storage device U*a*. The second input to the AND gate G54 is obtained from the output of the AND gate G53. That gate is supplied both with the voltage on the conductor *up* responsive to storage in the auxiliary storage device PU of the phase P1 of the original connection, and also to the indication of identity by the coincidence device VS between the address of the energy storage device furnished at the output of the address generator ZS and furnished by the output of the circulating storage device U*s*.

Upon operation of the AND gate G54, the AND gate G55 is operated at time slot P94, thereby causing the flip-flop K30 to be operated. If none of the flip-flop circuits K30, K31 and K32 is in operation during a control process of the central control apparatus, it is thereby identified that no signals corresponding to digits are stored as yet in the circulation storage device for connection stations to be called. In this case, the AND gates G56, G57, and G58 are operated, so that the flip-flop K36 is actuated. By this means, in time slot P2 (as provided by travel time link RP), a signal is supplied from AND gate G59, in the operation cycle. This signal can be operative to cause the transmission of the first digit from the digit receiving apparatus Z to the circulation storage apparatus U*a*, in the same fashion as transmission from the register R to the circulation storage device was carried out with the apparatus described in conjunction with FIG. 2.

Upon arrival of the second digit, by reason of the synchronization of the outputs of the address generators ZS and ZZ, the flip-flop circuit 37 is caused to be operated. This flip-flop is controlled by flip-flop K31, which is responsive to the voltage present on conductor 2, indicating that the second digit has not yet been transmitted to the storage device U*a*. Upon operation of the flip-flop K37, and at time slot P2 in the operation cycle (as a result of the delay furnished by the travel time link RP), the AND gate G60 is operated. This gate controls the transmission of the second digit identifying the station to be consulted, to the circulation storage device U*a*, in time slot P2.

The transmission of the third digit from the receiving device to the storage device U*a* takes place in the same fashion, by operation of flip-flops K32 and K38, after which the AND gate G61 operates, again in slot P2, to transfer the third digit to the storage device.

In the fashion indicated, the identification digits of the number identifying the station to be consulted are stored in the circulation storage device U*a* for speaking stations to be called, and these digits are stored in the same time slot as employed for reconfirmation. By reason of this fact, the speaking station to be consulted is caused to be connected to the speaking multiplex line SM in the same time slot P2. The consulting speaking station (the station taking part in the original call and initiating the consultation) and the consulted speaking station are connected together in their respective phases P1 and P2 to the speaking multiplex line with the aid of the speaking energy storage device ES. During the duration of the consultation connection the exchange office line need not be connected to the speaking multiplex line, if that is desired, and such can be arranged by suitable cancellation of the pulse P1 in the auxiliary storage device U*db*, to avoid operation of switch S*p*2 in that time slot. As in the operative embodiment described in conjunction with FIG. 2 (see Section B) the control apparatus can be constructed in such fashion that further effective dialing, such as dialing of a fourth identification digit after the complete number of the station to be consulted has been dialed, can be foreclosed. In such fashion, the flip-flop K33 and AND gate G62 may be operated to cause a busy signal to be switched onto the speaking multiplex line, as well as to cause release of the consultation connection which was to be made.

(D) Shifting of connections

As in the case of conventional techniques, it is desirable that it should be possible in accordance with the time multiplex operation of the present invention that a consulted speaking station be subject to connection with the waiting exchange office line. This connection of the consulted station, or shift of connections, can take place either by transfer caused by operation of the consulting speaking station, or through acceptance of the care exercised by the consulted speaking station. The following description is with respect to the control apparatus S*t*E shown in FIG. 4, which shows an operative embodiment of the system by which these operations can take place.

It is assumed in conjunction with the apparatus of FIG. 4 that the consulted speaking station is identified in the circulation storage device for calling connection stations with the slot P2, that is with the consultation slot phase. If connection is then to be made with the exchange office line either by transfer or by the acceptance by the consulted station, then the address of the exchange office line is alternatively to be left in the circulation storage device in the phase with which that address was originally recorded, or the address of the exchange office line is to be identified in the circulation storage device for stations to be called, in the consultation phase (e.g. P2). In the former case, only the original connection slot P1 and the consultation slot P2 are to be in effect joined together by means of the speaking energy storage devices, and the identification of the consulting speaking station is to be canceled. The corresponding blocking switch assigned to the storage device in which the address of the consulting station is stored is no longer to be activated.

Alternatively, the address of the consulted station can also be identified in the original time slot in the circulation storage device which remained free; that is, the storage device in which the address of the exchange office repeater was not stored in the original slot. In such fashion the transcribing or failure to transcribe an address, such as the address of the consulted station or the exchange office repeater, can take place either in the original slot or in the consultation slot, depending upon the manner most suitable to the corresponding system. In the following description only one operative embodiment will be described. In this operative embodiment the transmission of the address of the exchange office repeater will take place in the consultation slot in the circulation storage device for connection stations to be called, since it is assumed that the address of the consulted speaking station is registered in the consultation slot in the circulation storage device for calling stations. Consequently, it shall be assumed that the address of the consulting station (e.g. N1) is stored in circulation storage device U*a*, while the address of the exchange office repeater (e.g. AU*e*1) is stored in the circulation storage device U*b*, both in the slot P1. The address of the consulted station (e.g. N2) is stored in the circulation storage device U*a* in the consultation slot, such as slot P2. The selected speaking energy storage device, such as the storage device ES1, is operative to, in effect, join together the slots P1 and P2 in such fashion that the consulting and the consulted speaking stations can communicate with each other in these slots over the multiplex line SM. It is further assumed that the exchange office repeater is prevented from being switched onto the speaking multiplex line by prevention of operation of blocking switch S*p*2 in the slot P1.

If, during the existence of the consultation connection, the consulted station desires to initiate a transfer to communicate with the exchange office connection, such station can, for example, operate a corresponding digit key to both interrupt the loop connection and then also to send a certain frequency combination signal to indicate the desire to make the shift. This signal may be picked up in the consultation slot, such as P2 in the illustrative embodiment, in the auxiliary storage device PR. The command for the registration of this pulse in time slot P2 is provided by the aid of travel time link ZP into which a pulse is provided in the slot P2 in the information cycle and is then stored in the operation cycle by the AND gate G65. This gate provides a command pulse over the conductor *pr* to the input of the reconfirmation storage device PR (this being a circulation storage device), in the slot P2, providing of course that such device is available for use at this time in this phase. The control of the flip-flop circuit K52 in order to allow operation of the AND gate G65, is dependent upon operation of the flip-flop circuits K42, K46, K47, and the counter RZ.

Tracing the operation of these various circuits, the flip-flop circuit K42 is operated in the time slot P2 when the AND gates G66 and G67 are operated. The gate G66 receives one input from the signal multiplex line SA when the consulted speaking station provides a loop interruption to signal a transfer. A second signal is provided to the gate G66 when the conductor *vz* receives a signal from the comparator device VZ to indicate that the address of a free digit receiver is simultaneously provided at the outputs of the address generator ZZ and of the circulation storage device Uz.

The operation of the flip-flop circuit K46 is dependent upon the coincidence of the pulse in time slot P2 and the output of an AND gate G68. The AND gate receives the inversion of the output of the auxiliary storage register R, over the conductor *r*, requiring that the register R be free if the gate G68 is to be operated. That gate also receives over conductor *rp* the pulse in time slot P2 from the reconfirmation storage device PR. Finally, the AND gate G68 receives over conductor *vz* a signal indicating that a special signal requesting such a shift is transmitted.

The flip-flop circuit K47 is controlled by the AND gate G69 which is operated at time slot P2 when the digit receiving device Z indicates that the emitted frequency combination is a consultation or shift signal.

Finally, the counter RZ indicates by way of its "0" output that no signal is stored in the auxiliary register R, since the input of the counter is received over conductor *r* from that register.

By means of the coincidence of the outputs of the flip-flops K42, K46, and 247, the AND gate G71 provides an output to the AND gate G70. The other input to the AND gate G70 is provided by the "0" output of the counter RZ so that gate G70 similarly provides an output. At time slot P97, the AND gate G72 also provides an output, since it is supplied with the output of gate G70. Consequently, the flip-flop K52 is operated, so that the desire of the consulted speaking station to cause a shift is stored. As already indicated above, the AND gate G65 is operated in the operation cycle to provied the command at the time slot of consultation, so that a signal can be registered in the storage device R in the consultation phase. Simultaneously the address of the seized digit receiver is canceled in the circulation storage device Uz and the address generator for digit receivers is switched forward.

It could also be possible that the auxiliary storage apparatus R be not available, which would be identified by the counter RZ. In this case, instead of the flip-flop circuit K52 operating, the flip-flop K53 would operate and a pulse would be provided by way of AND gate G73 to cause cancellation of the address of the seized digit receiver in the circulation storage device Uz, and also to cause the switching forward of the address generator for digit receivers.

After the desire to shift on the part of the consulted speaking station is registered, the fact of authorization of that station to shift is checked. For such purpose it is assumed that the checking takes place by means of an evaluation apparatus UM, and it is further assumed that the authorization identification for consultation is switched on synchronously either at one output or (in the case of several authorizations) at different outputs of the evaluation apparatus UM, at the time the address of the reconfirmed connection station is available at the output of address generator AZ. It is further assumed that such authorization identification is provided to the central control apparatus S*t*E, this being by way of conductor *ub*. In such case the flip-flop circuit K55 is operated, upon operation of flip-flop circuits K40, K41 and K49.

The operation of flip-flop circuit K40 is dependent upon the signalling of a loop interruption over signal multiplex line SA, through AND gates G74 and G75.

The flip-flop circuit K41 is controlled by the AND gate G76, which receives one input from the comparator device VA. A voltage is present at the output of this device on the conductor *va* when the circulation storage device U*a* furnishes the address of the consulted station simultaneously with the furnishing of the same address by the address generator AZ. Another input of the AND gate G76 consists of the consultation pulse at time slot P2 obtained over conductor *rp* from the storage device PR. The final input to the gate G76 is obtained from the register R over conductor *r*, indicating that a digit is stored therein.

The output of AND gate G76 is connected to one input of AND gate G77, whose other input is the pulse at time slot P1. Consequently, at time P1, the flip-flop K41 is operated.

The flip-flop K49 is controlled by the AND gate G78 which receives an input from conductor *rp*, similarly to AND gate G76, but also receives an input from the auxiliary storage device H1 over the conductor *rh*. Since the register R is in use in time slot P2, the AND gate G78 provides an output and, at time slot P1, the flip-flop K49 is operated.

The operation of flip-flops K40, K41, and K49 causes operation of flip-flop K55, by control of AND gates G79, G80, G81, and G82, providing that flip-flop K50 is also operated. This flip-flop is controlled by an output over conductor *ub* from the control device UM which indicates the capacity of the consulted station to take part in a shift. In other words, if the consulted station is not authorized to shift connections, no voltage will be available on line *ub*, but it is assumed in this case that such authorization is present, so that the device UM will supply a voltage which will cause operation of the flip-flop K50.

It will be seen from FIG. 4 that the AND gate G79 is supplied with the outputs from flip-flops K40 and K41, and therefore supplies an output to the AND gate G80 at this time. The other input to AND gate G80 is supplied by flip-flop K49, so that the gate G80 supplies an input to AND gate G81. The other input to gate G81 is from flip-flop K50, so that the gate G81 provides one input to the AND gate G82. The other input to gate G82 is time slot P97, so that the flip-flop K55 is operated at that pulse time.

The flip-flop K55 provides one of the two inputs to an AND gate G83. The other input is supplied by the output of a travel time link RP whose input is supplied by the AND gate G85. The gate G85 is controlled in the fashion indicated in the drawing, including operation of the OR gate G84 to register in link RP a pulse of time slot P2 at this time. The travel time link provides a delay such that the gate G83 is operated during the operation cycle, as distinguished from the information cycle. The output of the AND gate G83 controls the switching forward of the address generator AZ for calling and called connection stations. The output of the gate G83 is also directed to the auxiliary storage device H1, to store a pulse of time slot P2 therein.

In the event that the apparatus UM does not provide an indication over conductor *ub* that the consulted station has the authority to make a shift in connections, the AND gate G81 is not operated, so that the gate G83 does not provide the necessary command pulse. However, the output of the flip-flop K50 is inverted in the input of AND gate G86, so that the gate G87 is operated to switch on the flip-flop K56. This operation is intended to cause cancellation of the pulse of slot P2 in the auxiliary storage device R, so that the desire to shift is cancelled. Consequently, the consultation connection can no longer be established.

After a pulse is stored in slot P2 in the auxiliary storage device H1 (that is, assuming the authorization to shift is indicated), such slot corresponding to the cycle of the address generator AZ for calling and called connection stations, there must now be registered a pulse in the circulation storage device R in the original time slot P1, this time being in dependence upon the cycle of the address generator ZS for speaking energy storage device. This operation requires the actuation of the flip-flop K43, and proper operation of the counter RZ.

The flip-flop K43 is controlled by the AND gates G88 and G89. The gate G88 receives one input from the conductor *vs* from the comparator device VS, indicating identity between the output of the address generator ZS for speaking energy storage devices, and the circulation storage device U*s*. Another input to the gate G88 is obtained from the storage device PR, containing the consultation phase, over conductor *rp*. The third input to the gate G88 is supplied over conductor *r* from the auxiliary register R, indicating the storage of a pulse in that register.

When a voltage is present on the conductor *r*, the counter RZ advances to postion 1, thereby supplying one input to the AND gate G90. The other input to that gate is supplied by the flip-flop K43, so that a coincidence is indicated by the gate. The gate G91 thereupon causes operation of the flip-flop K57. And, in the operation cycle after the delay supplied by the link SUP, a command is supplied by the gate G92. This command registers a pulse of the time slot P1, the original connection slot in the auxiliary storage device R. Moreover, the address generator ZS for speaking energy storage devices is caused to be switched forward by such command.

The operation of the flip-flop K58 and flip-flop K59 will now be described. Those operations are dependent upon previous operation of flip-flops K49, K50 and K51, as well as the switching of counter RZ to its position 2. Also there must first occur the respective operation of flip-flops K44 and K45. Operation of the flip-flop K44 is dependent upon the presence of voltages on conductors *a* and *va*, while operation of K45 is dependent upon the presence of voltages on conductor *b* and conductor *vb*. The latter voltages are present and indicate that the address generator AZ and the circulation storage device U*b* are simultaneously supplying the address of a station which is connected to the speaking multiplex line. That is, of course, the exchange office repeater address.

The flip-flop K49 is controlled by the AND gate G78 which responds to the indication of the consultation pulse phase P2, from the storage device PR, and the storage in the register R of a digit, such indication being furnished over the conductor *rh*.

The operation of the flip-flop K50 has already been described and takes place upon an indication of authority of the consulted station to initiate a shift, such authority being indicated by the device UM.

The flip-flop circuit K51 is controlled by the AND gates G96 and G95, which are operated upon the presence of a voltage on the conductor *uph*, connected to the storage device PR which stores the time slot of the original connection, and to the conductor *r* which in turn receives its voltage from the register R indicating storage of an identification digit in that register. The counter RZ is now in position 2 because of the receipt of the third digit of the address of the consulted station.

The respective operations of the counter RZ and the flip-flops K49 and K51 previously described, together with the operation of the flip-flop K45, cause operation of the AND gate G98 to turn on the AND gate G99 and thereby to operate flip-flop K59. In the operation cycle following this inquiry cycle, a command is given to the apparatus to cancel the address of the exchange office repeater in the circulation storage device U*b*, and in addition to cancel the corresponding address in the circulation storage device U*s* of the speaking energy storage device ES1. Further, the control causes cancellation of the switching signal in the auxiliary storage device U*ds*. Also, the signals in the circulation storage device R are canceled. This command also causes a busy signal to be placed in the slot of the original connection on circulation storage device U*bz*, so that the original consulting speaking station will be informed that the line is now busy.

The command referred to also provides for the registration in the circulation storage device U*b* of the address of the exchange office repeater taking part in the shifted call, but in the slot P2, instead of its original slot of registration, P1. This operation occurs by control of the flip-flop circuit K60. That control is through operation of the AND gate G97, as above described, together with the operation of the AND gate G100 which is turned on by the coincidence of the pulse P97 and the operation of gate G97. During the operating cycle, the operation of flip-flop K60 causes the AND gate G101 to emit a command in the time slot P2 (caused by the travel time link RP) to operate the switch D2 to store the address then furnished at the output of the address generator AZ in the storage device U*b*. This address is of course that of the exchange office repeater participating in the shifted connection. Moreover, a corresponding pulse is transmitted in the same slot P2 to the auxiliary circulation storage device U*db*, so that the exchange office repeater is connected to the speaking multiplex line by the opening of the switch S*p*2 in the slot P2.

At the same time the pulse circulating in the auxiliary storage device U*ds* is canceled so that the speaking energy storage device is no longer connected to the speaking multiplex line SM. Moreover, the address of the speaking energy storage device ES1 is canceled from the storage device U*s*. Also, the signals stored in the storage devices R and H1 in the slot P2 are canceled.

It will be evident that the above operations result in the consulted speaking station and the exchange office repeater being connected together in slot P2, since these stations are respectively identified in the circulation storage devices U*a* and U*b* in this slot. It will be evident, however, that the connections could as well be caused to take place in the time slot P1, by evident changes in circuitry.

It will further be evident that many minor changes could be made in the appartus shown in the drawings as operative embodiments of the invention. Accordingly, the invention is not to be considered limited to the particular embodiments disclosed and described herein, but rather only by the scope of the appended claims.

We claimed:

1. In a circuit arrangement for an exchange system operating in accordance with the time multiplex principle to make connections between pairs of stations, by connecting the station participating in each connection to a common multiplex highway periodically in the same time slot of a cycle containing a number of such time slots, with the stations participating in different connecttions being connected to the multiplex highway in different time slots, said arrangement being operable to permit one of the stations of an existing connection made in a first time slot to establish a new connection to a third station not in said existing connection, the improvement comprising:

first means for supplying a signal indicating the desire of said one station to establish said new connection with said third station, second means response to said signal to select a second time slot not in use to establish any connection, third means responsive to said second means to connect said third station to the multiplex highway periodically in said second time slot while said one station continues to be connected to the highway periodically in said first time slot, energy storage means operative to store energy then available from any station connected to it and to supply the stored energy to any station later connected to it, and fourth means responsive to said first and second time slots operative to connect said energy storage means to said multiplex highway in each said slot, so that energy may be transferred between said one and said third stations over said multiplex highway, even though they are connected to the highway in different time slots.

2. The apparatus of claim 1 in which:

said third means includes a circulating storage device for addresses of the stations associated with said exchange system, a register for temporarily storing the address of said third station received from said one station, means for connecting said register in said second time slot to said circulating storage device for addresses to transfer the address of said third station thereto, and switch means connected to said circulating storage device for addresses operative upon storage of the address of said third station therein to connect the third station periodically to said multiplex highway in the time slot of storage.

3. The apparatus of claim 2 in which said second means includes a circulating storage device for voltage pulses of slots not then in use.

4. The apparatus of claim 2 in which there are a plurality of said energy storage means each having a different address and said fourth means includes:

a second circulating storage device operative to store therein the address of a free energy storage means following supply by said first means of said signal in both said first and second time slots, and switch means connected to said second circulating storage device operative to connect the energy storage means identified by the address stored therein to said multiplex highway in the time slots of storage.

5. The apparatus of claim 4 in which said second circulating storage device has associated therewith an address generator operative to supply cyclically and sequentially at its output the addresses of each of said plurality of energy storage means, and fifth means operative upon indication that the energy storage means whose address is then supplied by said address generator is idle, and upon indication of desire for said new connection, to connect the output of said address generator to said second circulating storage device to store its output therein.

6. The apparatus of claim 2 including a counter responsive to receipt by said register of the complete address of said third station, and receipt of a further address signal from said multiplex line, to cause a busy signal to be generated.

7. The apparatus of claim 4 including a busy generator operable to supply a busy signal at its output, and means responsive to all of said energy storage means being in use, operative to connect the output of said busy generator to said multiplex highway.

8. The apparatus of claim 3 including a busy generator operable to supply a busy signal at its output, and means responsive to absence of voltage pulses in the circulating storage device of said second means, operative to connect the output of said busy generator to said multiplex highway.

9. The apparatus of claim 2 in which said register has a capacity of one digit and the address of said third station as dialed by said one station consists of a plurality of sequentially-transmitted digits, digit receiver means cyclically connected to said multiplex highway in said first time slot to receive said digits, sixth means for connecting said register to said digit receiver, and seventh means responsive to indication of receipt by said register of a digit to supply said digit circulating storage device for addresses.

10. The apparatus of claim 2 in which the address of said third station as dialed by said one station consists of at least one digit, digit receiver means cyclically connected to said multiplex highway in said first time slot to receive said digit, and means for connecting said digit receiver means to said circulating storage device for addresses to store the address of said third station therein in said second time slot.

11. The apparatus of claim 2 in which said third means further includes a second circulating storage device for addresses of the stations associated with said exchange system, said third station being operable to emit a special signal indicating a desire for a shift in connections, and eighth means responsive to emission by said third station of said special signal operative to control said second circulating storage device and said first mentioned circulating storage device in such fashion as to connect the other station of said existing connection to said multiplex highway in said first time slot and to connect said third station to the multiplex highway in said first time slot.

12. The apparatus of claim 11 including ninth means for storing an indication of the authority of a station to cause a shift in connections, said eighth means being connected to said ninth means for control thereby.

References Cited

UNITED STATES PATENTS

| | | | |
|---|---|---|---|
| 3,171,900 | 3/1965 | Bartlett | 179—27 |
| 3,225,144 | 12/1965 | Gebhardt et al. | 179—27 |
| 2,984,705 | 5/1961 | Harris | 179—15 |
| 3,223,784 | 12/1965 | Inose et al. | 179—15 |
| 3,319,005 | 5/1967 | Gaunt | 179—18 |

FOREIGN PATENTS

| | | |
|---|---|---|
| 981,174 | 1/1965 | Great Britain. |

KATHLEEN H. CLAFFY, Primary Examiner

A. B. KIMBALL, JR., Assistant Examiner

U.S. Cl. X.R.

179—18